US009689959B2

(12) United States Patent
Asaei et al.

(10) Patent No.: US 9,689,959 B2
(45) Date of Patent: Jun. 27, 2017

(54) METHOD, APPARATUS AND COMPUTER PROGRAM PRODUCT FOR DETERMINING THE LOCATION OF A PLURALITY OF SPEECH SOURCES

(71) Applicant: Fondation de l'Institut de Recherche Idiap, Martigny (CH)

(72) Inventors: Afsaneh Asaei, Martigny (CH); Herve Bourlard, Saxon / Vs (CH); Volkan Cevher, Chavannes-Pres-Renens (CH)

(73) Assignee: Foundation de l'Institut de Recherche Idiap (CH)

( * ) Notice: Subject to any disclaimer, the term of this patent is extended or adjusted under 35 U.S.C. 154(b) by 387 days.

(21) Appl. No.: 13/654,055

(22) Filed: Oct. 17, 2012

(65) Prior Publication Data

US 2013/0096922 A1    Apr. 18, 2013

(30) Foreign Application Priority Data

Oct. 17, 2011   (CH) ........................................ 1686/11

(51) Int. Cl.
| | |
|---|---|
| *G10L 21/0272* | (2013.01) |
| *G01S 3/80* | (2006.01) |
| *G10L 21/0308* | (2013.01) |
| *H04W 4/02* | (2009.01) |
| *G10L 19/008* | (2013.01) |
| *H04W 4/04* | (2009.01) |

(Continued)

(52) U.S. Cl.
CPC ........ *G01S 3/8006* (2013.01); *G10L 21/0308* (2013.01); *G10L 19/008* (2013.01); *G10L 21/0272* (2013.01); *G10L 25/78* (2013.01); *G10L 2021/02166* (2013.01); *H04W 4/025* (2013.01); *H04W 4/043* (2013.01); *H04W 64/00* (2013.01)

(58) Field of Classification Search
CPC .. G10L 21/0272; G10L 19/008; H04W 4/025; H04W 4/043; H04W 64/00
USPC ..................... 381/56, 122; 704/270, E11.001
See application file for complete search history.

(56) References Cited

U.S. PATENT DOCUMENTS

| | | | | |
|---|---|---|---|---|
| 6,826,284 B1 * | 11/2004 | Benesty | .................... | G01S 5/22 348/14.08 |
| 6,999,593 B2 * | 2/2006 | Rui | ..................... | G10L 21/0272 348/14.08 |

(Continued)

OTHER PUBLICATIONS

Asaei, et al. "Multi-Party Speech Recovery Exploiting Structured Sparsity Models," IDIAP Research Report, Jul. 2011.*

(Continued)

*Primary Examiner* — Pierre-Louis Desir
*Assistant Examiner* — Forrest F Tzeng
(74) *Attorney, Agent, or Firm* — Blank Rome LLP (57) ABSTRACT

The present invention discloses a method, apparatus and computer program product for determining the location of a plurality of speech sources in an area of interest, comprising performing an algorithm on a signal issued by either one of said plurality of speech sources in the area to for iteratively recover data characteristic to said signal, wherein the algorithm is an iterative model-based sparse recovery algorithm, and wherein for each of a plurality of points in said area, the iteratively recovered data is indicative of a presence of a plurality of speech sources contributing to the signal received at each of a plurality of points in the area.

21 Claims, 3 Drawing Sheets

(51) Int. Cl.
*H04W 64/00* (2009.01)
*G10L 21/0216* (2013.01)
*G10L 25/78* (2013.01)

(56) References Cited

U.S. PATENT DOCUMENTS

| | | | | |
|---|---|---|---|---|
| 7,720,241 | B2* | 5/2010 | Okimoto | H04S 1/00 381/17 |
| 7,834,795 | B1* | 11/2010 | Dudgeon | G06K 9/6289 341/155 |
| 2004/0037436 | A1* | 2/2004 | Rui | H04R 3/005 381/92 |
| 2005/0234686 | A1* | 10/2005 | Cheng | G06F 17/12 703/2 |
| 2011/0222707 | A1* | 9/2011 | Hwang | H04R 3/005 381/92 |
| 2011/0317522 | A1* | 12/2011 | Florencio | G01S 3/8006 367/129 |
| 2012/0128165 | A1* | 5/2012 | Visser | G10L 19/008 381/56 |
| 2012/0149415 | A1* | 6/2012 | Valaee | H04W 64/00 455/507 |
| 2012/0224456 | A1* | 9/2012 | Visser | G01S 3/8006 367/127 |
| 2012/0259590 | A1* | 10/2012 | Ye | H03M 7/3062 702/189 |
| 2012/0294540 | A1* | 11/2012 | Sun | G06F 17/30247 382/225 |
| 2013/0346082 | A1* | 12/2013 | Aly | G06F 17/30943 704/270 |

OTHER PUBLICATIONS

VidalSPM11—Rene Vidal, "Subspace Clustering," IEEE Signal Processing Magazine, Mar. 2011.*

* cited by examiner

Room impulse response

Estimated RIR by structured sparsity constrained opimization

Estimated RIR by least squared minimization

Fig. 4

METHOD, APPARATUS AND COMPUTER PROGRAM PRODUCT FOR DETERMINING THE LOCATION OF A PLURALITY OF SPEECH SOURCES

REFERENCE DATA

This application claims priority of Swiss Application No. 2011 CH-1686, filed Oct. 17, 2011, the entire contents of which is hereby incorporated by reference.

FIELD OF INVENTION

The present invention is directed to a method, apparatus and a computer program product that aid in speech source localisation. In particular, the present invention is directed to a method, apparatus and a computer program product that aid in the localisation of competing sound sources.

BACKGROUND

Multi-party speaker localization is a very active research area, playing a key role in many applications involving distant-speech recognition, scene analysis, hands-free videoconferencing, gaming and surveillance. Despite the vast efforts devoted to the issues that arise in real-world applications, the development of systems to localize the speaker in acoustic clutter of unknown competing sound sources yet remains a demanding challenge.

Various methods and apparatuses for the determination of the location of a plurality of speech sources are known in the art.

For example, one method known in the art, that aims at the determination of the location of a plurality of speech sources, proposes an approximation framework for distributed target localization in sensor networks. In accordance with the method, the unknown target positions are represented on a location grid as a sparse vector, whose support encodes the multiple target locations. The location vector is linearly related to multiple sensor measurements through a sensing matrix, which can be locally estimated at each sensor. The multiple target locations are determined by using linear dimensionality-reducing projections of sensor measurements. The overall communication bandwidth requirement per sensor is logarithmic in the number of grid points and linear in the number of targets, ameliorating the communication requirements.

In accordance with another reference know in the art, a multiple target localization approach is proposed by exploiting the compressive sensing theory, which indicates that sparse or compressible signals can be recovered from far fewer samples than that needed by the Nyquist sampling theorem. In accordance with the method, multiple target locations are formulated as a sparse matrix in the discrete spatial domain. The proposed algorithm uses the received signal strengths (RSSs) to find the location of targets. Instead of recording all RSSs over the spatial grid to construct a radio map from targets, far fewer numbers of RSS measurements are collected, and a data pre-processing procedure is introduced. Then, the target locations can be recovered from these noisy measurements, only through an l1-minimization program. The proposed approach reduces the number of measurements in a logarithmic sense, while achieves a high level of localization accuracy.

In accordance with yet another method known in the previous art on source localization is realized using resampling within a sparse representation framework. In particular, the amplitude and phase information of the sparse solution are considered holistically to estimate the direction-of-arrival (DOA), where a resampling technique is developed to determine which information will give a more precise estimation.

The earlier methods rely on complex mathematical models that place a large computational burden on the systems implementing them, and appear to operate best at identifying what is the direction of the sound signal of the source instead of what is the actual location of the source.

Therefore, what are needed are methods, apparatuses and computer program products capable of accurately provide the location of the sound source, even in complex environments where competing speech sources are present.

BRIEF SUMMARY OF THE INVENTION

It is therefore an object of the present invention to provide methods, apparatuses and computer program products capable of accurately provide the location of the sound source, even in complex environments where competing speech sources are present.

This above referenced objective technical problem is solved at least by the method of claim 1, by a system provided by claim 13, and a computer program product of claim 14.

In accordance with a first aspect of the present invention, a method for determining the location of a plurality of speech sources in an area of interest is proposed, the method comprising performing an algorithm on a signal issued by either one of said plurality of speech sources in the area for iteratively recovering data characteristic to said signal, wherein said algorithm is an iterative model-based sparse recovery algorithm, and wherein for each of a plurality of points in said area, said iteratively recovered data is indicative of a presence of a plurality of speech sources contributing to said signal received at said each of a plurality of points in said area.

In accordance with a further aspect of the present invention a system for determining the location of a plurality of speech sources in an area of interest is proposed, the system comprising at least a data bus system, a memory coupled to the data bus system, wherein the memory comprises computer usable program code, and a processing unit coupled to the data bus system, wherein the processing unit executes the computer usable program code to perform an algorithm on a signal issued by either one of said plurality of speech sources in the area for iteratively recovering data characteristic to said signal, wherein said algorithm is an iterative model-based sparse recovery algorithm, and wherein for each of a plurality of points in said area, said iteratively recovered data is indicative of a presence of a plurality of speech sources contributing to said signal received at said each of a plurality of points in said area.

In accordance with a yet further aspect of the present invention is proposed a computer program product for determining the location of a plurality of speech sources in an area of interest comprising a tangible computer usable medium including computer usable program code for determining the location of a plurality of speech sources in an area of interest, the computer usable program code being used for performing an algorithm on a signal issued by either one of said plurality of speech sources in the area for iteratively recovering data characteristic to said signal, wherein said algorithm is an iterative model-based sparse recovery algorithm, and wherein for each of a plurality of points in said area, said iteratively recovered data is indicative of a presence of a plurality of speech sources contributing to said signal received at said each of a plurality of points in said area.

Other characteristics and advantages of the present invention will be apparent in connection with the dependent claims.

In accordance with the present invention, the method of the invention is further characterised by the plurality of speech sources comprising N speech sources present in the area of interest. The plurality of points in the area of interest comprises a plurality of M sound receiving devices receiving signal from the N plurality of speech sources. The M sound receiving devices may be embodies by a plurality of microphones or a microphone array. M is equal or greater than 2, while N could be any arbitrary number. The number of speech sources and the number of sound receiving devices is independent from each other.

In accordance with the method proposed by the present invention, a model approximation is performed at each iteration. The method of the present invention further comprises estimating the geometry of the area of interest by performing localization of a single sound source and its images in a free space model or localization of multiple sound sources and their images followed by low-rank clustering to identify the images attributed to each source, estimating a space impulse response filter $h_{ij}$ from each speech source N to each sound receiving device and performing least-squares fitting between the estimated space impulse response filter and an image model generated by an Room Impulse Response filter to calculate a plurality of reflection coefficients for said plurality of points in said area, wherein said plurality of points are reflective points.

The method of the present invention yet further comprises performing a least-squares fitting method to calculate a plurality of reflection coefficients for the plurality of reflective points in the enclosure area of interest. The method of the invention uses a structure scarcity constraint to capture the main reflections of the plurality of points in the area of interest. The main reflections are captured using the Image model of the multi-path effect.

The method of the present invention also may comprise the step of defining a N-block-sparse signal, and to estimate the sparse signal via a model-based sparse recovery algorithm to improve the efficiency of the sparse recovery. The degrees of freedom of the sparse signal within a block configuration are limited, and the structure of a block comprises either adjacent frequencies or harmonics of fundamental frequency.

The present invention also proposes a computer data carrier storing a presentation content created with the method of the present invention.

The methods of the invention exhibit a plurality of advantages such as the multi-source localization problem is cast as a model-based sparse signal recovery where structured sparsity models are exploited for acoustic modeling as well as signal estimation. The experimental results confirm that the method is very effective for multi-party speaker localization applications. Unlike prior art methods, the framework provided by the present invention provides a flexible design and architecture of the sensor array. It can provide increased robustness in noisy conditions due to the model-based sparse recovery scheme. It is capable of resolving closely spaced sources while the computational cost can be reduced by random sampling of the mixture components and performing speaker localization from highly undersampled data.

Other characteristics and advantages of the present invention will be apparent in connection with the following drawings and the following description.

BRIEF SUMMARY OF THE FIGURES

For a more complete understanding of the present invention, the objects and advantages thereof, reference is now made to the following descriptions taken in conjunction with the accompanying drawings, in which.

Non-limiting and non-exhaustive embodiments of the present invention are described with reference to the above referenced figures, wherein like reference numerals refer to like parts throughout the various views unless otherwise specified. The order of description should not be construed as to imply that these operations are necessarily order-dependent.

DETAILED DESCRIPTION OF THE INVENTION

With the aid of the means proposed by the present invention, such as methods, apparatuses and computer-program products, the present invention pinpoints the location of the source in an area.

Various expressions will be used in the present document while describing the present invention. These terms are to be understood as discussed bellow or in accordance with the meaning a person skilled in the art of pedestrian simulation would award said terms.

In the context of the present invention it is referred to as a "source" or as a "sound source" a source of speech, a person speaking, another device that emits speech or music, an emergency operator, etc. Essentially, any being or device that produces noise is understood as constituting a "source" in accordance with the present invention. Further, the source is understood as preferably emitting speech, but the source may be as well emitting music, an emergency signal or any other sound that is of interest and that may be transmitted to and received by a microphone.

In the context of the present invention it is referred to as an "area" a space, preferably an enclosed space, such as a conference room, an emergency center command room, or essentially any space wherein sounds of interest are produced and received by a plurality of reception devices.

In the present document by reception devices is preferably understood a plurality of microphones. It is understood that it is within the scope of the present invention a reception device capable to receive sound and any device that operates by the principles of an acoustic-to-electric transducer or sensor, that converts sound into an electrical signal. The plurality of microphones may be implemented as a microphone array, as any number of microphones operating in tandem. Typically, an array is made up of omnidirectional microphones distributed about the perimeter of a space, linked to a computer that records and interprets the results into a coherent form. Arrays may also be formed using numbers of very closely spaced microphones. Given a fixed physical relationship in space between the different individual microphone transducer array elements, simultaneous digital signal processing of the signals from each of the individual microphone array elements can create one or more "virtual" microphones. Different algorithms permit the creation of virtual microphones with extremely complex virtual polar patterns and even the possibility to steer the individual lobes of the virtual microphones directivity patterns so as to home-in-on, or to reject, particular sources of sound.

Since the means of the present invention facilitate to pinpoint where is the source located inside a room, the means of the invention allow to obtain precise information regarding the source, such as its direction and its actual distance from the array of microphones. As such, the solution proposed by the present invention provides increased granularity for the determination of a location of the source, such as to the location of the speaker.

As it will be discussed in detail in the following, the means of the invention allow identifying the location of the speakers in multi-party scenarios. By "multi-party scenario" or "multi source environment" is understood for example a plurality of speakers or speech sources present in a room and emitting concurrently, for example, 2, 3 persons in a room talking simultaneously, or a TV, radio and array of speakers all issuing noise concurrently. Such speck sources are as well considered to be competing speech sources.

By employing the means and methods of the present invention, it is possible to find the location, with granularity, of all the speakers at the same time.

For a speech recognition system, it is important to find the direction of speech and/or the location of each and every contributor to the conversation within the room. For a speech recognition system, for example in a meeting where there are instances of overlapping parties speaking all at the same time, wherein a microphone array is recording the meeting, it is a microphone array that assists with the extraction or the estimation of the derived or received speech signal with a high accuracy and to suppress all the interfering signals in the background. For these purposes it is necessary to know the location of all the other interfering signals.

This knowledge assists in the better placement of microphones through an area. Once the preferred location of the microphones within the area is known, the overall quality of the recorded speech in that area is improved. As a result, a better design for the microphones array is facilitated within the area where the speech will take place. Further, since the better placement of the microphones leads to the acquisition of the desired speech signal with high quality, the non-desirable interfering noises and the interfering speakers may be suppressed.

A solution proposed in the art, to acquire a speech signal with high quality, is based on beam-forming pr beam-pattern steering. An array of microphones has a particular type of directivity. For a single microphone, the type of directivity is omnidirectional, meaning it receives signal from all directions, without any preference. But for an array of microphones, for which it is designed what is the direction of signal that is preferred, it is necessary to determine what is the direction of the preferred signal of the main speaker, located inside the room from where we want to gain the signal with high quality. Further, it is necessary to find what is the direction specific for the other speakers for whom their signal will be suppressed, since their signal should not interfere with the signal of interest.

In the art, one solution proposed to this problem has been to steer the microphones' beam-pattern towards the preferred speaker and to steer away the microphones from the non-preferred speaker. This solution has a very important weakness, in that it operates under the assumption that no reverberation is present in the room where the speech takes place. However, this assumption may not be correctly made for the majority of spaces or areas where noise and most especially speech, is received by a microphone array. This weakness of the solution proposed in the art is further highlighted by the fact that in reality the reverberation in the room exists due to the effect of multipath propagation, meaning the signal is reflected from each of the walls and each object in the room, such as the furniture.

A solution that takes into account the presence of reverberation and the effect of multipath is not known in the art. As it will be explained further in this document, the means and methods of the present invention do take into account the presence of the reverberation in recording speech in the area of interest, and are based on modeling the acoustics of the multi-path representation of speech. Further reverberation is incorporated to enhance the desired signal and the interferences are suppressed.

As it will be as well described in detail in this document the means and methods of the present invention perform localization of multiple-sources. Several solutions are available in the art for performing localization, but none of said solutions performs localization of multi-speakers. Further, as it will be as well described in detail in this document, in accordance with the solution proposed by the present solution, the modeling of the space or area where the speech takes place is performed in the frequency domain. In contrast the solutions currently proposed in the art propose modeling in the time domain.

In further contrast with the solutions proposed in the art, the means and methods of the present invention facilitate localization of multiple sources of speech in an area of interest, said sources of speech possibly even speaking concurrently. The means and the methods of the present invention aim to facilitate finding the exact location of the concurrent or competing sources of speech, as opposed to the solutions available in the art that aim only at finding the direction of the sources.

The method of determining the location of a plurality of speech sources in an area proposed by the present invention is based on tag driving the acoustic channel or the room with having acoustic multipath effect or reverberation. The method is based on sparse recovery and compressive sensing theory.

The method of determining the location of a plurality of speech sources in an area, proposed by the present invention, approached and solved the problem of how to accurately provide the location of the sound sources, even in complex environments where competing speech sources are present, from a completely new perspective and as such, it proposes completely new tools and techniques to solve it. The method relies upon compressive sensing and sparse recovery techniques. More precisely the method uses iterative sparse signal recovery techniques to achieve accuracy in finding the location of the sound source, even in complex environments where competing speech sources are present.

By "sparse" is understood very few, not very many. When applied to the concepts of the present invention, such as in an area of interest, by sparse area is understood a void filled with very few sources of speech.

Figure 1:
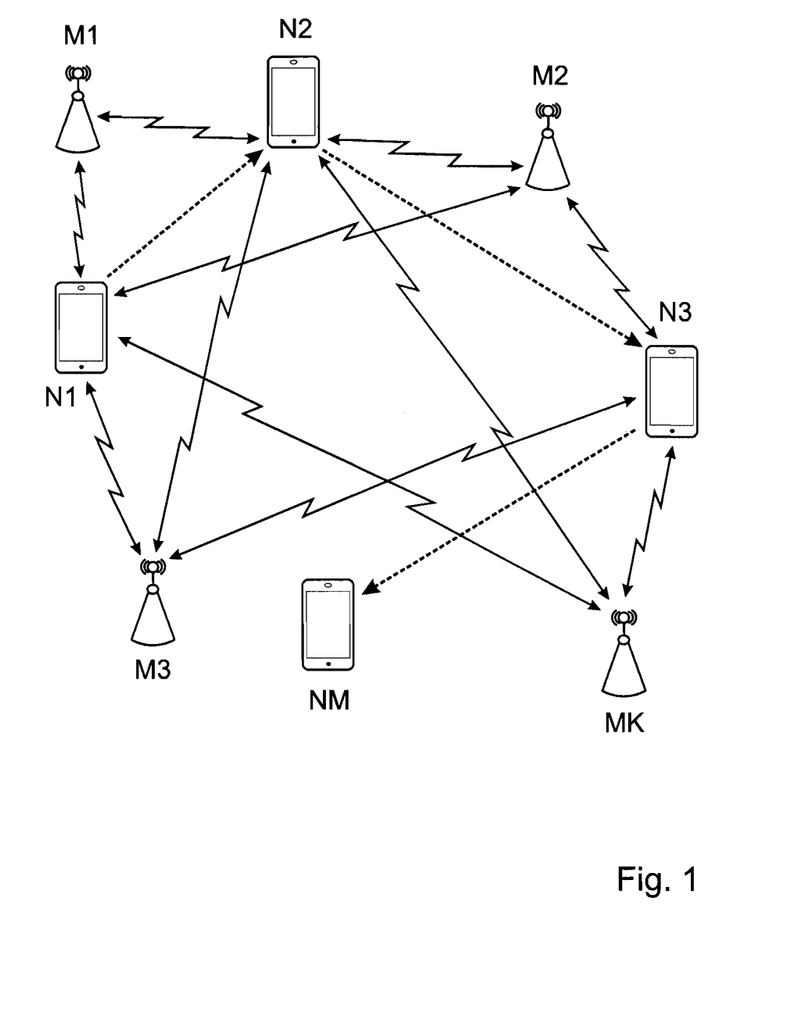
FIG. 1 discloses a room wherein a number of N sources of speech and a number of M speech reception devices are present.

Referring for example to the illustration of FIG. 1, FIG. 1 discloses a room wherein a number of N speakers are present. For the sake of simplicity and exemplarily it is assumed that the speakers are mobile devices emitting sound. Further it is illustrated that a number of M microphones are as well present in the room, microphones that are capable of receiving signal emitted from each and every one of the speech sources present in the room.

An area of a room modeled by the sparse approach is assumed to be a void populated by a few sources of speech or sources of energy which generate sound signal. The rest of the room is assumed to be empty of generating sources. In order to find the sparse solution or the location of the sound generating sources inside the room an iterative approach is used in accordance with the method proposed by the present invention.

As mentioned above the method uses iterative sparse signal recovery techniques to achieve accuracy in finding the location of the sound source, even in complex environments where competing speech sources are present. After the first round of the iteration, the location of the first source may be found. After the second round, the location of the second source may be found and after the nth iteration, the location of the nth source is found. Alternatively the algorithm is capable of estimating the location of all the sources in the first round and to refine the estimates iteratively to improve the accuracy.

The area of interest may comprise several parties engaging in a conference, or a TV, a radio emitting, and people speaking at the same time, or in the entertainment industry, a scenario where multiple competing sources of sound are present. It is also assumed that a number of receiving devices, such as microphones are present in the area of interest. Irrespective of the nature of the parties present in the area, it is of interest to find the direction of the desired speaker and the interference sources present in order to suppress their signal, and in order to gain the wanted signal accurately and with high quality. To generalize for any application where multiple parties talk at the same time and a plurality of microphones is present, or an array of microphones is present. There is a need to find the location of microphones and to recover the desired signal.

In accordance with one embodiment of the present invention, in a room a plurality of microphones is present that may be preinstalled. The preferred location of the speaker is identified via the method proposed by the present invention. The location of the microphones is known, it has been predetermined.

In accordance with another embodiment of the present invention, with the aid of the present invention, the location of the microphones may be as well determined, not only the location of the preferred speaker. The method of the present invention may be generalized for the determination of the location of the microphones in the case that the location of the microphones has not been predetermined.

In the following, it will be assumed that the location of the microphones has been predetermined. Various scenarios may be imagined for the modeled space, such as that there are a plurality of microphones or an array of microphones installed in the area of interest and one or more sources of speech is present. There in no limitation to the number of sources or speakers in the area of interest versus the number of microphones present in the area of interest. This is as well an important distinguishing point versus the solutions currently present in the art that usually prescribe that the number of sources should be less than the number of microphones. The means and methods of the present invention may be applied to an area where there are no limitations in the number of microphones with respect to the number of sources.

A plurality of sound sources in an area is denoted with N. M is indicative of the number of microphones present in the area. With si is denoted the signal of the various sources, with i ranging from 1 to N. Each source signal is coming through a different channel in the room to be acquired by each of the microphones.

The multi-channel recording of the area of interest may be modeled via a linear convolutive mixing process, that described the area as:

$$x_j(n) = \sum_{i=1}^{N} h_{ji}(n) * s_i(n), \quad (1)$$
$$j = 1, \ldots, M;$$

where
$s_i$ refers to the source signal i passing through the room acoustic channel and is recorded at a sensor of the microphone $x_i$.

The notation * stands for convolution operation.

The number of sources is N and the number of microphones is M.

The room impulse response from source i to sensor j is approximated by the filter $h_{ji}$.

Consider that there are N microphones distributed in the area of interest. Each xj(n) is the time sampling of each of the microphones, the number of which is from 1 to N. Each microphone is acquiring a superposition of the signals emitted by each one of the signal sources si coming through a corresponding channel xij. By xij may be denoted a channel between the microphone j and source i. Each channel in the area of interest in convoluted, as indicated by the operation *, with the sound signal and possibly with another signal coming through another channel. All the results obtained are summed together, and the so obtained signal is indicative for the signal acquired by the microphone.

As it may be noted, the formulation is stated in time domain. As stated above, the method of the present invention utilizes iterative sparse signal recovery techniques to achieve accuracy in finding the location of the sound source, even in complex environments where competing speech sources are present. As such the above will be further represented in the sparse domain. To do so, the speech signals will be transformed to the spectro-temporal domain. As such, the means and method for localizing N competing sources from M convolutive mixtures are proposed.

The filter $h_{ji}$ used is an approximated Room Impulse Response (RIR) filter. Hij(n) is indicative of the room's impulse response or of the room's acoustic channel or the RIR filter between a microphone j and a source i. As it will be discussed further in this document, the room's impulse response is indicative of several delays and attenuations of the signal. As it will be shown in the following, the room's impulse response may be estimated via formula number 2 and it is approximated as consisting of several shifted and scaled version of Dirac representations.

In the context of the present invention the "delta Dirac" or "delta Dirac function" is understood as a generalized function on the real number line that is zero everywhere except at zero, with an integral of one over the entire real line. The delta function is a mathematical object that appears inside an integral. While from this perspective the Dirac delta can usually be manipulated as though it were a function, formally it is defined as a distribution that is also a measure. In many applications, the Dirac delta is regarded as a week limit of a sequence of functions having a tall spike at the origin. The approximating functions of the sequence are thus "approximate" or "nascent" delta functions.

Each delta Dirac has an amplitude that is important from the stand point of the attenuation of the signal and has some delay that shifts the signal. This causes a phase-shift in frequency domain. As shown in equation 2 the amplitudes are summed together. These aspects of the invention are all explained in greater detail while referring to the equation 2.

Referring again to equation 1, it is stated while discussing the formula that the formula is stated in time domain, despite the fact that no express time dependency is expressed in the formula. What is meant is that is that if in $x_j(n)$ n=1, reference is made to the first sample, n=2, reference is made to the second sample, etc. For sampling a signal with 8 KHz, 8000 samples of xj are needed to sample 1 second of microphone signal.

Although in connection with equation 1 it is shown that the method employs the time domain to sample the microphone signal, as it will be shown in the following in this document, the final recovery of the signal is stated in the frequency domain. The results of the application of formula 1 are reformulated to the frequency domain after applying a short time Fourier transform of the received signals.

The short time Fourier transform is obtained by windowing the signal using a Hann function of length of 256 ms and obtaining short-time frames of the signal. The Fourier transform is then applied on each frame to obtain the frequency representation of each frame. The concatenation of the frequency representations form the time-frequency representation of speech. Each frame of speech is treated independently in the proposed source localization scheme.

As specified earlier while referring to the formula 1 by character * is understood a convolution. Although in mathematics and, in particular, in functional analysis, a convolution is a mathematical operation on two functions, producing a third function that is typically viewed as a modified version of one of the original functions, giving the area overlap between the two functions as a function of the amount that one of the original functions is translated, in the context of the present invention the convolution operation is viewed as a combination of the room impulse response and the $s_i$ refers to the source signal i passing through the room acoustic channel and is recorded at a sensor of the microphone $x_j$. Via the convolution operation it is described the room as being modeled via the characteristic $xj(n)$ that is illustrative for the signal recorded at each microphone.

The equation 1 is descriptive for the entire space, since for $x_j(n)$ that is illustrative for the signal recorded at each microphone, j is from 1 to M, where M is the number of microphones in the space or the M may also be the number of combinations of microphones in the space. As such in accordance with the present invention, a method is proposed for localizing N competing sources from M convolutive mixtures. The N sources may be single sources of competitive speech, such as several sources that are talking at the same time. The N sources compete for M convolutive mixture microphones that receive the speech emitted by the N competing sources. The characteristics of the sources are convoluted with the channel and they are superimposed to make a combined speck signal.

As disclosed above, in accordance with one embodiment of the present invention, the iterative sparse recovery approach is used for iteratively recovering speech. To this end the present invention proposed a structured sparse speech representation in the area of interest.

In accordance with one exemplary scenario, N speakers may be distributed in a planar area. Exemplarily it is considered for the purposes of this example only that the area of interest is a planar area but of course the area of interest may be as well a three-dimensional area. The planar area of interest is discretised into a grid of G cells.

The granularity of the discretisation is at the choice of the user and it is elected depending on the application. For example, if the room has only a few speakers, a granularity of 50 cm is sufficient. More granularity translates into a larger computational effort and the larger is the problem that needs to be solved. If what is needed is to find out what is the position of a microphone, the planar area might be discretised into a grid of G cells as small as 5 cm/5 cm. If a speaker is attempted to be localized, since a speaker can occupy a grid element of 50/50 cm, the planar area is discretised accordingly. The 50 cm resolution provides a good compromise between the computational cost of problem that needs to be solved and finding accurately the location of the source.

In accordance with a preferred embodiment of the invention the area of interest may be discretised into discrete elements that are square but it is as well envisioned in accordance to the invention that the grid is formed by a plurality of undefined shapes.

Upon performing the discretisation of the space, the spatial representation of the sources is entangled with the spectral representation of the speech signal and a vector Z is defined. The vector Z is a binary vector, denoting whether each time-frequency component belongs to the source located at each grid or not.

As stated above, a spatial representation of the sources is performed. The sources are represented in the form of a vector. Each cell of the grid created by discretising the planar area of interest is enumerated and the entire signal that is coming from the grid is collected in vector form, rather than in a metric form. A vector of a signal coming from each grid is formed and the vectors are combined vertically to form a vector characteristic to the signal coming from the entire room. Although the signal could be expressed in the time domain, a frequency transform is applied to the so created vector to express the signal in the frequency domain. As a result what is obtained is a signal expressed in a frequency domain, corresponding to each cell of the grid.

The Discrete Fourier Transform (DFT) is applied on the short frames of the recorded signal of size 256 ms. Since the sampling frequency is 8 kHz, the size of DFT is 1024 points which corresponds to a 4 Hz frequency resolution in representing the speech signal.

The origin of the so created vector is at an arbitrary position in the room of interest. It is with respect to this origin that the location of the speakers in the area of interest is found.

Given the origin of the Cartesian coordinate system for representing the geometry of the room, the center of each cell on the grid is associated to its specified abscissa and ordinate. Hence, the speaker localized at a particular cell, is pinpointed exactly with respect to the geometry of the room.

In one possible embodiment of the invention, since the position of the microphones and the geometry of the microphone array is already known, position that is assumed to be a fixed position, it may be assumed that the center of the microphone array is the center of the room. As such the location of the source may be as well attempted to be found versus the center of the microphone array that is already known.

The spatial representation of the sources is made by discretisation into a grid. Each cell of the discretisation grid may be characterized via a discrete vector. A sum of each discrete vector results in a vector that provides for the spatial representation of the sources. Each element of this vector corresponds to a spatial representation.

A spectral representation of the speech signal is obtained via a short time Fourier transform applied to the sound signal expressed in the time domain.

The short-time Fourier transform is defined as applying DFT on the short frames of the speech signal. As the utterances are usually quite long (several seconds), it is divided into short-term frames by applying a short-term window function on the long utterance. The frames have 50% overlapping to smooth the transition between the frames. Applying DFT on short frames of speech yields the spectral representation of speech signal.

As stated above, the spatial representation of the sources is entangled with the spectral representation of the speech signal and a vector Z is defined. As discussed above a vector is formed and each components of the vector corresponds to the source located at a spatial position. This vector forms the spatial representation of the sources. Each component of the vector could have a different meaning, for example it could mean the energy of the source or it could denote the frequency the source is generating. A particular quantity that we associate with each component is the spectral representation of the source.

By entanglement we refer to exemplarily to mathematical mapping and the term denotes any mathematical or combinatory operation by which the vector Z is formed. As discussed above the vector Z is formed by performing first a spatial representation of each element in a grid via which the area of interest in discretised and providing a spectral representation for each component of the vector.

The vector Z is a binary vector, denoting whether each time-frequency component belongs to the source located at each grid or not.

The vector Z is a high-dimensional unknown sparse vector which is estimated using a sparse recovery algorithm. The indices of the non-zero components of Z, referred to as the support of Z, correspond to the signal generated from each cell of the grid. Hence, any non-zero element in Z indicates that a source exists at the corresponding cell.

In general, when a binary vector is multiplied by a matrix, the multiplication is done by the vector selecting some particular columns of that matrix. For example if the multiplication is done from the right side, the particular matrix columns corresponding to the support of the binary vector are selected. In general a binary vector only performs a selection between what is already there and what is not present. As such binary vectors are very useful in describing a sparse space, to provide a selection between the few elements of the sparse space that are present.

The vector Z is found via a sparse recovery algorithm. Since the vector is only a selector, if it contains for example a high energy component, the vector selects the columns of the matrix corresponding to the high energy component.

Vector Z is defined for the purpose of finding out how the solution looks like so the appropriate algorithm may be selected. Vector Z has a binary format and it is also very sparse. With the aid of vector Z, if prior information is available about the structure and about how the solution looks like, the proper algorithm may be selected to find a solution.

The definition of vector Z is indicative only of the algorithm that needs to be further applied in accordance with the present method to find an accurate description of the space. Vector Z facilitates a good choice of the algorithm that will lead to the complete characterization of the space.

Vector Z indicates which cells of the grid are generating a sound signal. As there are G cells on the grid, and assuming only 1 instance of the received signal, Z is a G dimensional sparse vector. If there are P instances of the signal, the are sparse in the same manner which indicates that all of the P instances are generated from the N cells of the gird. No matter how many instances are considered, they all share a common sparsity pattern; in other words, the non-zero components of Z are grouped or structured to generate the receiving signal. Depending on the type of structure (or model) underlying the components of Z, different structured or model-based sparse recovery algorithms are appropriate. The block and harmonic structures that exist are identify to solve the problem of multi-source localization and as such the sparse recovery algorithm is applied accordingly. The use of model-based sparse recovery is more efficient as it exploits the synergy of the P instances of signal to estimate the location of sources. Since the components of Z each corresponds to a particular cell of the grid, when Z is estimated, the high-energy components are identified, which indicate which cell has an active source generating the signal.

Due to the limited ability of the articulatory system to generate many frequencies at the same time, speech signals are approximately sparse in spectro-temporal domain while in general, they are a broad-band signal.

Due to the spatial sparsity, a block-structure can be defined which underlies the sparse coefficients and which is exploited in sparse recovery algorithms to improve the efficiency of the sparse recovery by limiting the degrees of freedom of the sparse signal within a block configuration.

A sparse vector has a block structure if the non-zero components happen in blocks. It could be re-arranged into a matrix which has very few non-zero rows, hence, row-sparse while in each non-zero row, all of the columns have non-zero energy. As there are N sources in the room, the components of Z correspond to the cells of the grid. If we assume P instances of the signal, all the instances form N groups where each group indicates the signal coming from each cell. This property is exploited and source localization is achieved using all the frequency band of the broad-band speech signal. Previous approaches perform localization per individual frequency. As the solution proposed by the present invention exploits several frequencies jointly together, the performance is improved and the solution it is more robust to noise and environmental ambiguities.

The space of interest that has been characterized above is as well modeled via a structured sparse acoustic model.

For the purposes of modeling the room's acoustics the room is considered to have the acoustics of a rectangular enclosure consisting of finite-impedance walls. Taking into account the physics of the signal propagation and multi-path effects modeled by the Image Method. In accordance with the present invention, the Room Impulse Response (RIR) is calculated at all centers of the grid cells using the geometry of the room and the reflection ratios of the walls.

The impulse response function is a unique signature of the room and the geometry of the room can be reconstructed provided that up to second order of reflections are known. It is assumed that there are segments of non-overlapping speech at the initialization step of the system. Single source images are localized using the sparse recovery algorithm in a free space measurement model while the deployment of the grids captures the location of early reflections. The support of the acoustic channel corresponds to the grids where the recovered energy of the signal is maximized. Given the support of the channel, the best fit geometry of the room is estimated and the attenuation constants are approximated in least mean-squares sense. This regression assumes that the reflection coefficients are fixed and independent of frequency.

Given the impulse response for a particular point, the reflection coefficients are estimated more accurately by least squares fitting. A cross relation technique may be used for the blind estimation of the impulse response. A structure sparsity constraint captures the main reflections characterized by the Image Method.

Given the room geometry and the source location, the index of the highest energy component of the RIR is determined by the Image Method and denoted by $\Omega_d$ which refers to the direct path component calculated precisely as $\alpha$ and $\Omega_r$ which refers to the support of the reflections.

In the context of the present invention, $\Omega_d$ indicates the location of a spike in RIR which corresponds to the direct path propagation of sound. Given the source location, we compute the distance between the microphone and the source. The time that it takes for the sound signal to travel this distance is computed as the distance divided by the speed of sound. Hence we can compute precisely what is $\Omega_d$. The location of the Images of the source are also determined from the geometry of the room. The Images of the source with respect to each wall is located behind the wall at the same distance to the wall that source is located. Hence, we can compute precisely the location of the spikes on RIR which correspond to the reflections of the wall and denoted by $\Omega_r$. We also know that the attenuation of the sound in direct path propagation has a spherical attenuation characteristic which indicates that $\alpha$ is inverse of the distance between the source and the microphones.

$\eta = [X_i(L) - X_j(L)]]$ and $H = [h_j h_i]^T$ are defined, where $X_m$ is the convolution matrix obtained from the received data at microphone m and h denotes the acoustic filter.

The convolution matrix is obtained from the concatenating the time instances of the recorded signal at each microphones according to the convolution operation. H is the unknown sparse filter coefficient vector with the lower half corresponding to the RIR between the source and microphone j and the upper half corresponding to the RIR between the source and microphone i.

The structure of a sparse filter is obtained through the following optimization:

$$\hat{H} = \mathrm{argmin} \|H\|_1 \ s.t. \|\Pi H\|_2 \le \epsilon, H(\Omega_d) = \alpha, H(\Omega_r) > 0 \quad (2)$$

The goal is to estimate the unknown acoustic channels between the source and the microphones denotes as H. As H is a sparse vector, we use sparse approximation algorithm to estimate H. As the location of the spikes in H corresponds to the direct path propagation (denoted by $\Omega_d$) and the reflections (denoted by $\Omega_r$), we compute these values and perform sparse approximation constrained on the conditions specified by the this structure characterized by the Image model. The solution to this formulation stated in Equation (2), is the estimation of the RIR function between the source and the microphone.

In the following the model-based Sparse Signal Recovery model is applied to completely characterize the space.

Given the source-sensor transfer function, we can form the array manifold matrix from which we obtain a projection matrix $$\Phi = [\Phi_1, \ldots \Phi_g, \ldots, \Phi_G],$$

where $\Phi_g$ denotes the projections corresponding to grid g.

The source-sensor transfer function is the RIR between the source located at each cell and the microphone located at a known position. Given the geometry of the room and the estimated absorption coefficients of the wall, we can calculate RIR for all over the grid. Denoting the RIRs or the acoustic channels between the center of each cell and microphone array as $\Phi_g$, we concatenate all of the acoustic projections and form matrix $\Phi$ which defines the acoustic projections associated to the acquisition of the source from any of the cells by the array of microphones. It is also called as the microphone array manifold matrix.

Hence, the sparse vector Z generates the signal ensemble as $$X = \Phi_g \Phi_g^{-1} Z.$$

A model-based sparse recovery approach may be used to recover Z. To incorporate the underlying structure of the sparse coefficients, a model approximation is performed along with a gradient calculation at each iteration. Since the sparse coefficients in the model proposed by the present invention live in at most N blocks, an N block-sparse signal is approximated by reweighting and thresholding the energy of the blocks.

The block structure consists of either the adjacent frequencies or the harmonics of the fundamental frequency. The recovered signal Z denotes the contribution of each speaker to the actual sensor observations in the block corresponding to the speaker position.

Figure 2:
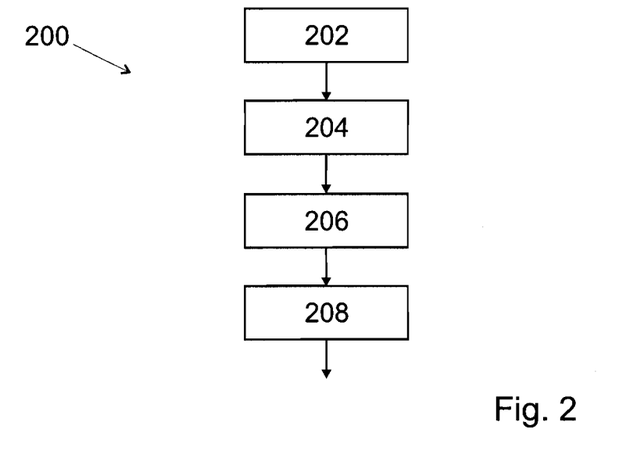
FIG. 2 is a flow chart representation of the method for determining the location of N speech sources in a space, in accordance with an embodiment of the present invention.

FIG. 2 is a flow chart representation of the method for determining the location of N speech sources in a space, in accordance with an embodiment of the present invention.

The method 200 illustrated in FIG. 2, for determining the location of a plurality of speech sources in an area of interest, comprises a plurality of steps that will be briefly described in the following and that represent at least in part a generalization of the subject matter discussed up to now in the present document.

In accordance with the method 200 of the present invention, the method comprises the step 202 of performing an iterative sparse recovery algorithm on a signal for iteratively recovering data Z characteristic to said signal. For each of a plurality of points in the area of interest, the recovered data is indicative of a presence of a plurality of speech sources, all contributing to the signal received at each of a plurality of points in the area of interest.

In accordance with the method of the present invention, in a step 204 the geometry of the area of interest is estimated by performing localization of a single sound and its images or localization of multiple source sources and their images followed by low-rank clustering the images attributed to each source in a free space model, and in a subsequent step

206 the space impulse response filter $h_{ij}$ is estimated from each speech source N to each sound receiving device.

In accordance with the method 200 of the present invention, in a subsequent step 208, the least-squares fitting between the Image modeled RIR and the estimated RIR is applied to calculate a plurality of reflection coefficients for the plurality of points in the area of interest.

A structure sparsity constraint may be used to capture the main reflections of said plurality of points in the area of interest and an N-block sparse signal may be defined, and the sparse signal may be exploited via a sparse recovery algorithm to improve the efficiency of the sparse recovery.

Therefore to summarize, the multi-source speech localization problem is cast as a model-based sparse signal recovery where structured sparsity models are exploited for acoustic modeling as well as signal estimation. The results confirm that the method is very effective for multi-party speaker localization applications. Unlike prior art methods, the framework provided by the present invention provides a flexible design and architecture of the sensor array. It can provide increased robustness to noisy conditions due to the model-based sparse recovery scheme. It is capable of resolving closely spaced sources while the computational cost can be reduced by random sampling of the mixture components and performing speaker localization from highly under-sampled data.

The geometry of the room is estimated during a preliminary step of calibration or room estimation. The above mentioned method can be applied to the localization of speech sources in various applications, for example in order to retrieve the location of speakers during conferences, teleconferences, audio recording, audio processing, performances, distant-speech recognition, scene analysis, surveillance, etc.

The above mentioned method can be used for speaker identification, wherein the identification of each speaker is based on its location at different times. The above mentioned method can be used for speaker tracking, wherein the localization of each speaker is repeated a number of times so as to track each speaker. The above mentioned method can be performed in real time immediately after delivery of each speech signal, or at any time thereafter, based on audio recordings from different microphones.

The different microphones could be separate discrete microphones, or an array of microphones, or a plurality of arrays of microphones.

The above mentioned method can be carried out with an independent software application, with a plug-in cooperating with an existing main application or run in a browser, as a program executed on the client side, such as without any limitation a Flash or Java or Javascript of HTML5 program, or as a program executed on a server side.

The above described methods may be performed by any suitable means capable of performing the operations, such as various hardware and/or software component(s), with suitable processing applications and/or firmware. The above described methods and apparatus can be used in professional and consumer systems, such as computers, servers, laptops, PDAs, netbooks, tablets, still and video cameras, mobile phones, webcams, beamers, audio acquisition systems, teleconference equipments, microphones, etc. The localization can be computed by any suitable microprocessor, DSP, FPGA or other suitable processing system.

Any steps of a method according to the present application may be embodied in hardware, in a software module executed by a processor, or in a combination of the two. Thus, the invention also relates to a computer program product for performing the operations presented herein. If implemented in software, the functions described may be stored as one or more instructions on a computer-readable medium. Some examples of storage media that may be used include random access memory (RAM), read only memory (ROM), flash memory, EPROM memory, EEPROM memory, registers, a hard disk, a removable disk, other optical disks, a cloud storage system, or any available media that can be accessed by a computer, a camera or an image acquisition apparatus.

The method and the computer program product of the present invention exemplarily find applicability in a dialog system wherein the means of the present invention provide the capability to acquire speech with high quality. The speech so acquired is then transcribed via a computer connected to the speck acquisition module that creates the minutes of a speech session such as a conference. Further, method and the computer program product of the present invention exemplarily find applicability in a gaming or entertainment system.

Figure 3:
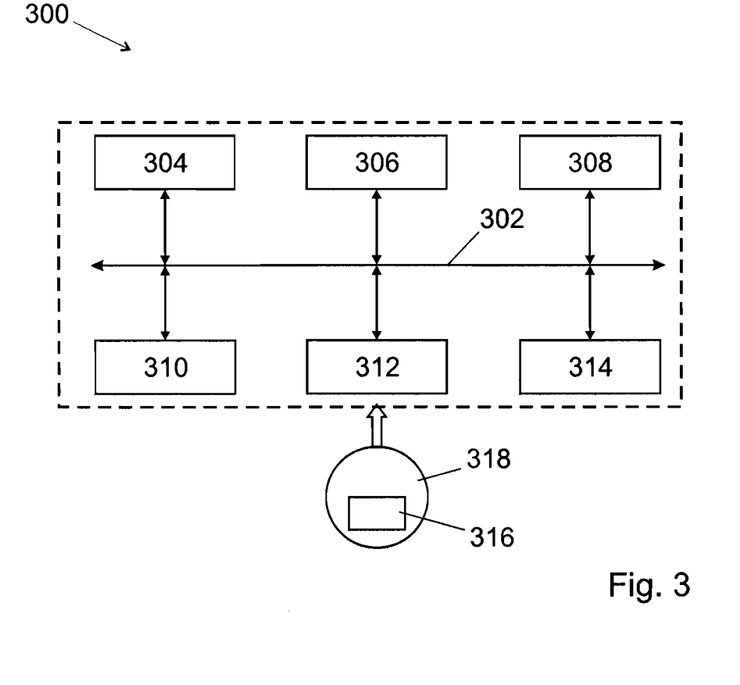
FIG. 3 is the illustration of an embodiment of a data processing system in which a method for determining the location of N speech sources in a space, in accordance with an embodiment of the present invention, may be implemented.

Turning now to the illustration of FIG. 3, FIG. 3 is an embodiment of a data processing system in which a method for determining the location of N speech sources in an area of interest, in accordance with the present invention, may be implemented.

FIG. 3 is an embodiment of a data processing system 300 in which an embodiment of a method for determining the location of N speech sources may be implemented. The data processing system 300 of FIG. 3 may be located and/or otherwise operate at any node of a computer network, that may exemplarily comprise clients, servers, etc., and it is not illustrated in the figure. In the embodiment illustrated in FIG. 3, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, the processor unit 304 may be a symmetric multi-processor system containing multiple processors of the same type.

In some embodiments, the memory 306 shown in FIG. 3 may be a random access memory or any other suitable volatile or non-volatile storage device. The persistent storage 308 may take various forms depending on the particular implementation. For example, the persistent storage 308 may contain one or more components or devices. The persistent storage 308 may be a hard drive, a flash memory, a rewritable optical disk, a rewritable magnetic tape, or some combination of the above. The media used by the persistent storage 308 also may be removable such as, but not limited to, a removable hard drive.

The communications unit 310 shown in FIG. 3 provides for communications with other data processing systems or devices. In these examples, communications unit 310 is a network interface card. Modems, cable modem and Ethernet cards are just a few of the currently available types of network interface adapters. Communications unit 310 may provide communications through the use of either or both physical and wireless communications links.

The input/output unit 312 shown in FIG. 3 enables input and output of data with other devices that may be connected to data processing system 300. In some embodiments, input/output unit 312 may provide a connection for user input through a keyboard and mouse. Further, input/output unit 312 may send output to a printer. Display 314 provides a mechanism to display information to a user.

Instructions for the operating system and applications or programs are located on the persistent storage 308. These instructions may be loaded into the memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on the computer readable media 318 that is selectively removable and may be loaded onto or transferred to data processing system 300 for execution by processor unit 304. Program code 316 and computer readable media 318 form a computer program product 320 in these examples. In one example, the computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, the computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, the program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown. For example, a storage device in data processing system 300 is any hardware apparatus that may store data. Memory 306, persistent storage 308, and computer readable media 318 are examples of storage devices in a tangible form.

The means and methods of the present invention have been employed exemplarily in the framework of Multichannel Overlapping Numbers Corpus (MONC). This database is acquired by playback of utterances from the original Numbers corpus. In connection with this embodiment of the invention, the recordings were made in a 8.2 m×3.6 m×2.4 m rectangular room containing a centrally located 4.8 m×1.2 m rectangular table. The positioning of the loudspeakers was designed to simulate the presence in the room of 3 competing speakers seated around a circular meeting room table of diameter 1.2 m. The loudspeakers were placed at 90° spacing, at an elevation of 35 cm (distance from table surface to center of main speaker element). An eight-element, 20 cm diameter, circular microphone array was placed in the center of the table to record the mixtures. The speech signals are recorded at 8 kHz sampling frequency.

Figure 4:
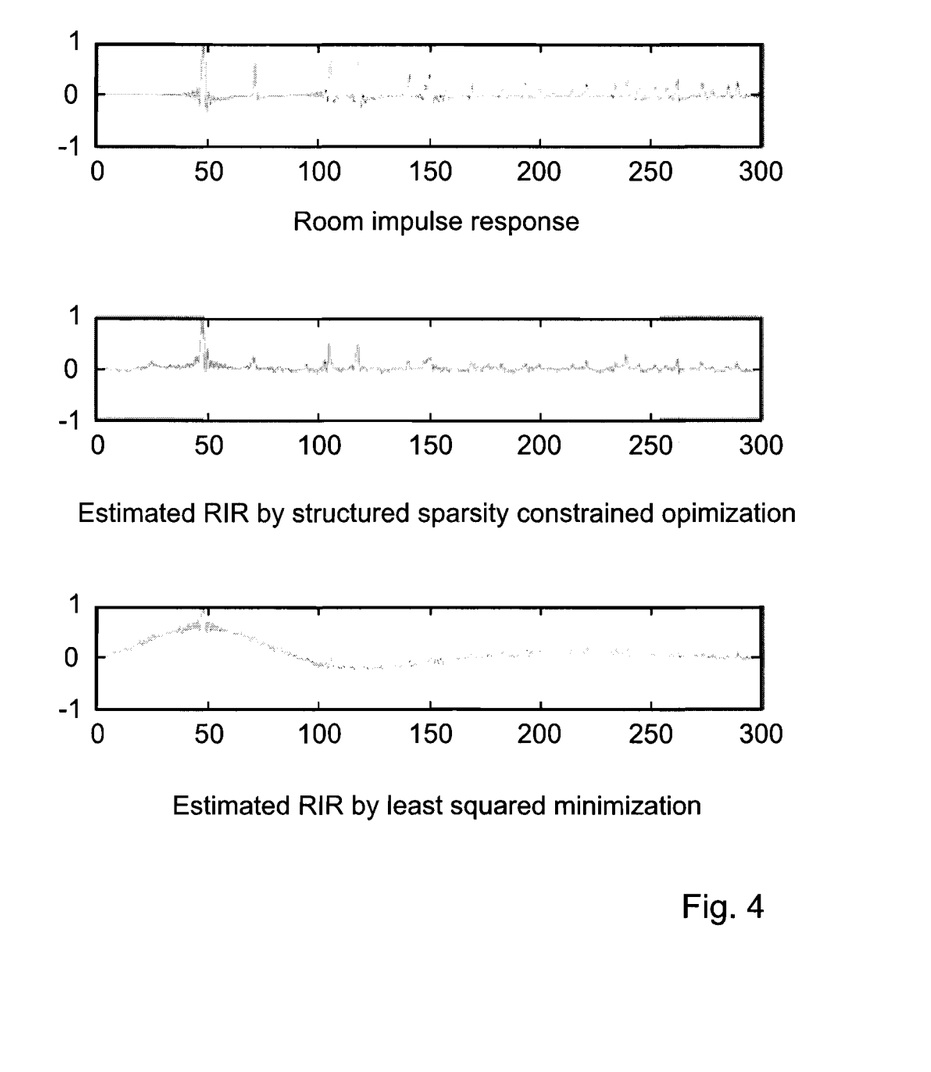
FIG. 4 shows the effectiveness of the room impulse response estimation with the structured sparsity constraints and the alternative least squared optimization from noisy data.

FIG. 4 shows the effectiveness of the room impulse response estimation with the structured sparsity constraints and the alternative least squared optimization from noisy data.

In FIG. 4 the first graph on the top illustrates an example of a room impulse response function. This is unknown and it is subject to being estimated in accordance with the means and the methods of the present invention, through the optimization formula given by equation (2), from the noisy recordings of two microphones. The middle graph represents the results obtained after the application onto the data collected by the two microphones of the means and methods proposed by the present invention. The last graph, situated at the bottom of the figure, demonstrates the results obtained by applying onto the same data obtained from the microphones of a method known in the art, the cross relation technique. Comparison between the second graph and the third graph shows that the second graph is much more similar to the desired room impulse response function, illustrated in the first graph. A key difference in our proposed approach is the consideration of the structured sparsity characterized by the image model. Hence, the results highlight the importance of the structured sparsity model in identifying the acoustics of the room.

The above mentioned method can be applied as well in connection with other applications. For example the means and methods of the present invention may be applied to the localization of speech sources in various applications, for example in order to retrieve the location of speakers during conferences, teleconferences, audio recording, audio processing, performances, distant-speech recognition, scene analysis, surveillance, speaker diarization, immersive audio processing, mobile application, entertainment, elderly assistance and medical services.

The means and methods of the present invention can be used for multi-channel signal acquisitions and enhancement where the location of the speakers are provided as the desired points to steer the beam-pattern of a microphone array.

The means and methods of the present invention may be used for dialogue systems, wherein the location of the speakers are retrieved for segmentation of the conversation and high-quality speech acquisition.

The method and the computer program product of the present invention exemplarily find applicability in a dialog system wherein the means of the present invention provide the capability to acquire speech with high quality. The speech so acquired is then transcribed via a computer connected to the speck acquisition module that creates the minutes of a speech session such as a conference. Further, method and the computer program product of the present invention exemplarily find applicability in a gamming system.

The method of the present invention can be used for distant speech recognition systems relying on the high quality signal acquisition enabled by an array of microphones steered towards the desired speaker and the suppression of the interfering sources.

The method of the present invention can be used for speaker diarization systems where the information about the location of multiple speakers is exploited to identify and cluster which parts of the recorded signal belong to which speaker.

The method of the present invention can be used for video-conferencing systems where the information about the location of multiple speakers is used for steering the cameras as well as high-quality directional acquisition of the participants' signals.

The method of the present invention can be used in gaming and entertainment products, wherein the information about the location of multiple sources are provided as the input to the software or hardware modules to act accordingly and run a specific amusement plan.

The method of the present invention can be used for surveillance systems, wherein the information about the sources and tracking the trajectory of the source movement are used to monitor the behavior and activities occurring on the scene as well as eavesdropping.

The method of the present invention can be used for immersive audio signal processing, wherein a spatialized sound is generated as emerging from a particular location in space.

The method of the present invention can be used for products assisting the elderly to find and localize the events occurring in their presence.

The method of the present invention can be used for smart phones applications for analysis of the context in offline and web-based services adapted to the speaker proximity to the identified resources.

The method of the present invention can be used for medical equipment as well as monitoring and protection systems in hospitals and asylums for managing and observing the actions of the staff and patients.

Accordingly, the disclosed embodiments present an apparatus, method and computer program product for the localisation of the N speech sources. The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

In addition, the flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A deterministic method for determining the locations of a plurality of speech sources in an area, comprising:

performing by a processing unit, an algorithm on a signal issued by each of a plurality of speech sources in the area, the plurality of speech sources received on one or more microphones in the area, wherein said algorithm is an iterative model-based sparse recovery algorithm so that said algorithm iteratively recovers data characteristics which represent separate signals issued by each individual speech source, from mixed recordings of the plurality of speech sources; and wherein for each of a plurality of points in said area, said iteratively recovered data characteristics of said signal is indicative of presence of a plurality of speech sources contributing to said signal received at said each of a plurality of points in said area, estimating by the processing unit, a geometry of the area by performing localization of each of multiple sound sources and their images, using a free-space measurement model, and low-rank clustering by the processing unit, to identify the images attributed to each of the sources, wherein the step of estimating by the processing unit, a geometry of the area by performing localization of each of multiple sound sources and their images, using a free-space measurement model, comprises, identifying an area of interest within said area, and discretizing the area of interest into discrete elements;

for each discrete element forming a vector of a signal coming from that discrete element;

identifying using said formed vectors those discrete elements where the recovered energy of the signal is maximized, wherein support of the acoustic channel corresponds to the discrete elements where the recovered energy of the signal is maximized;

estimating the best fit geometry of the room and the attenuation constants are approximated in least mean-squares sense.

2. The method of claim 1, wherein said plurality of speech sources comprises N speech sources present in the area, and wherein N is an arbitrary number.

3. The method of claim 1, wherein said plurality of points in said area of interest comprises a plurality of M sound receiving devices receiving signal from said N plurality of speech sources, and wherein M is equal to or greater than 2.

4. The method of claim 3, wherein the number of speech sources and the number of sound receiving devices is independent from each other.

5. The method of claim 1, wherein to incorporate an underlying structure of sparse coefficients a model approximation is performed at each iteration along with a gradient calculation, wherein said approximation comprises reweighting and thresholding an energy of said N speech sources blocks.

6. The method of one of the claim 1, further comprising estimating a geometry of the area by performing localization of a single sound source and its image or multiple sound sources and their images followed by low-rank clustering the images attributed to each of the sources using a free-space measurement model.

7. The method of claim 1, further comprising
estimating a acoustic channel impulse response filter $h_{ij}$ from each speech source of said plurality of speech sources to each sound receiving device, and
performing least-squares fitting between the estimated impulse response filter and an image model generated impulse response filter to calculate a plurality of reflection coefficients for said plurality of points in said area, wherein said plurality of points are reflective points.

8. The method of claim 7, further comprising using a structured sparsity constrained optimization algorithm to capture main reflections of said plurality of points in said area.

9. The method of claim 8, wherein said main reflections are captured using an image method.

10. The method of claim 8, further comprising defining a N block-sparse speech signal, and exploiting said structured sparse signal via a sparse recovery algorithm to improve the efficiency of the sparse recovery.

11. The method of claim 10, wherein the degrees of freedom of the structured sparse signal within a block configuration are limited.

12. A deterministic system for determining the location of a plurality of speech sources in an area, comprising:
at least a data bus system,
a memory coupled to the data bus system,
wherein the memory comprises computer usable program code, and
a processing unit coupled to the data bus system,
wherein the processing unit executes the computer usable program code to perform an algorithm on a signal issued by each of a plurality of speech sources in the area, the plurality of speech sources received on one or more microphones in the area, wherein said algorithm is an iterative model-based sparse recovery algorithm so that said algorithm iteratively recovers data characteristics which represent separate signals issued by each individual speech source, from mixed recordings of the plurality of speech sources;
and wherein for each of a plurality of points in said area, said iteratively recovered data is indicative of a presence of a plurality of speech sources contributing to said signal received at said each of a plurality of points in said area,
and to estimate a geometry of the area by performing localization of each of multiple sound sources and their images, and
low-rank cluster to identify the images attributed to each of the sources using a free-space measurement model;
wherein estimating by the processing unit, a geometry of the area by performing localization of each of multiple sound sources and their images, using a free-space measurement model, comprises,
identifying an area of interest within said area, and discretizing the area of interest into discrete elements;
for each discrete element forming a vector of a signal coming from that discrete element;
identifying using said formed vectors those discrete elements where the recovered energy of the signal is maximized, wherein support of the acoustic channel corresponds to the discrete elements where the recovered energy of the signal is maximized;
estimating the best fit geometry of the room and the attenuation constants are approximated in least mean-squares sense.

13. A computer program product for determining the location of a plurality of speech sources in an area of interest, comprising:
a tangible non-transitory computer usable medium including computer usable program code for determining the location of a plurality of speech sources in an area of interest,
the computer usable program code being used for
performing an algorithm on a signal issued by each of a plurality of speech sources in the area, the plurality of speech sources received on one or more microphones in the area, wherein said algorithm is an iterative model-based sparse recovery algorithm so that said algorithm iteratively recovers data characteristics which represent separate signals issued by each individual speech source, from mixed recordings of the plurality of speech sources;
and wherein for each of a plurality of points in said area, said iteratively recovered data is indicative of presence of a plurality of speech sources contributing to said signal received at said each of a plurality of points in said area;
performing estimating a geometry of the area by performing localization of each of multiple sound sources and their images, and
performing low-rank clustering to identify the images attributed to each of the sources using a free-space measurement model;
wherein the step of performing estimating by the processing unit, a geometry of the area by performing localization of each of multiple sound sources and their images, using a free-space measurement model, comprises,
identifying an area of interest within said area, and discretizing the area of interest into discrete elements;
for each discrete element forming a vector of a signal coming from that discrete element;
identifying using said formed vectors those discrete elements where the recovered energy of the signal is maximized, wherein support of the acoustic channel corresponds to the discrete elements where the recovered energy of the signal is maximized;
estimating the best fit geometry of the room and the attenuation constants are approximated in least mean-squares sense.

14. A method according to claim 1, wherein the low-rank clustering comprises low-rank matrix optimization of said images with their associated absorption coefficients.

15. A method for determining the location of a plurality of speech sources in an area, comprising:
performing by a processing unit, an algorithm on a signal issued by either one of said plurality of speech sources in the area to iteratively recover data characteristics of said signal, the plurality of speech sources received on one or more microphones in the area, wherein data characteristics represent separated signal of each individual source from mixed recordings of plurality of speech sources wherein said algorithm is an iterative model-based sparse recovery algorithm; and wherein for each of a plurality of points in said area, said iteratively recovered data characteristics of said signal is indicative of a presence of a plurality of speech sources contributing to said signal received at said each of a plurality of points in said area, estimating by the processing unit, a geometry of the area by performing localization of a single sound source and its image, or multiple sound sources and their images, where said image or images are defined as virtual acoustic mirrored sources using a free-space measurement model and low-rank clustering, the images attributed to each of the sources, and by the processing unit, estimating a space impulse response filter $h_{ij}$ from each speech source to each sound receiving device, and performing optimization between the estimated space impulse response filter and an image model generated by a Room Impulse Response filter to calculate a plurality of reflection coefficients for said plurality of points in said area, wherein said plurality of points are reflective points, wherein the of estimating by the processing unit, a geometry of the area by performing localization of each of multiple sound sources and their images, using a free-space measurement model, comprises, identifying an area of interest within said area, and discretizing the area of interest into discrete elements;

for each discrete element forming a vector of a signal coming from that discrete element;

identifying using said formed vectors those discrete elements where the recovered energy of the signal is maximized, wherein support of the acoustic channel corresponds to the discrete elements where the recovered energy of the signal is maximized;

estimating the best fit geometry of the room and the attenuation constants are approximated in least mean-squares sense.

16. A method according to claim 15, wherein the low-rank clustering comprises low-rank matrix optimization.

17. A method according to claim 15, wherein the low-rank clustering comprises low-rank matrix optimization of said images with their associated absorption coefficients.

18. A deterministic method for determining the location of a plurality of speech sources in an area, comprising:

performing by a processing unit, an algorithm on a signal issued by each of a plurality of speech sources in the area, the plurality of speech sources received on one or more microphones in the area, wherein said algorithm is an iterative model-based sparse recovery algorithm so that said algorithm iteratively recovers data characteristics which represent separate signals issued by each individual speech source, from mixed recordings of the plurality of speech sources; and wherein for each of a plurality of points in said area, said iteratively recovered data characteristics of said signal is indicative of presence of a plurality of speech sources contributing to said signal received at said each of a plurality of points in said area, estimating by the processing unit, a geometry of the area by performing localization of each of multiple sound sources and their images, using a free-space measurement model, and low-rank clustering by the processing unit, to identify the images attributed to each of the sources wherein the step of estimating by the processing unit, a geometry of the area by performing localization of each of multiple sound sources and their images, using a free-space measurement model, comprises, discretizing as a grid of cells an area centred at the room centre, and large enough such that at least one copy of the room with respect to each wall is included, wherein said discritized area corresponds to a space with no boundaries;

for each cell on the grid, forming a vector of a signal coming from that cell;

identifying using said formed vectors those cells where the recovered energy of the signal is maximized, wherein locations of virtual and actual sources correspond to the cells where the recovered energy of the signal is maximized; the closest source to the centre of the grid is used as an anchor point for image model fitting, where the room boundaries are the perpendicular lines located at the mid-point of the anchor point and its images, thereby enabling estimation of the room geometry.

19. A method according to claim 18 wherein, if multiple actual sources are detected within a predefined threshold from the grid centre, multiple room boundaries are obtained, and the method further comprise the step of determining the geometry of the room by using least mean-squared error using all the estimated room geometries from multiple sources.

20. A method according to claim 1 wherein the step of discretizing the area of interest into discrete elements, comprises discretizing the area of interest into discrete elements which have uniform resolutions, or discretizing the area of interest into discrete elements which have non-uniform resolutions.

21. A method according to claim 4 wherein the number of sound receiving devices is smaller than the number of speech sources.

* * * * *